Figure 1:
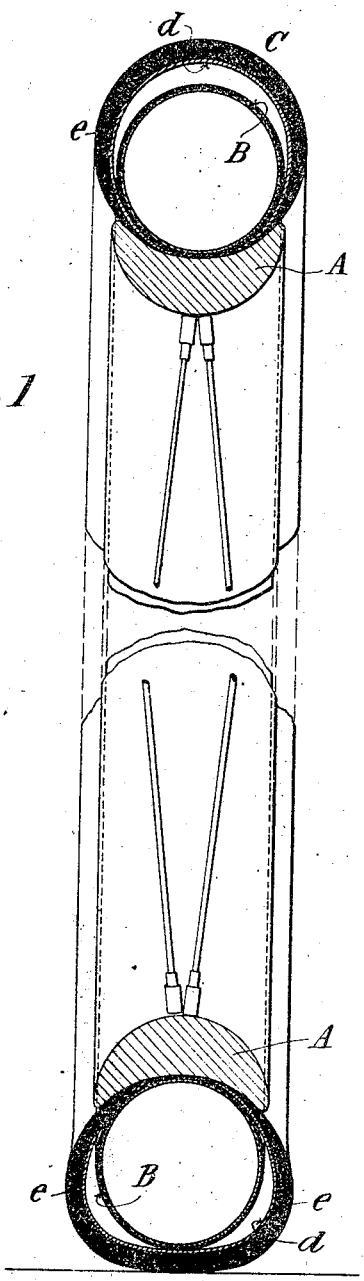

(No Model.)

A. STRAUS.
PNEUMATIC TIRE.

No. 588,612. Patented Aug. 24, 1897.

Witnesses:
Raphaël Netter
Edwin B. Hopkinson.

Alexander Straus, Inventor
by Ken. Curtis & Page Attys.

UNITED STATES PATENT OFFICE.

ALEXANDER STRAUS, OF NEW YORK, N. Y., ASSIGNOR TO ANNIE STRAUS, OF SAME PLACE.

PNEUMATIC TIRE.

SPECIFICATION forming part of Letters Patent No. 588,612, dated August 24, 1897.

Application filed June 3, 1897. Serial No. 639,217. (No model.)

*To all whom it may concern:*

Be it known that I, ALEXANDER STRAUS, a citizen of the United States, residing at New York, in the county and State of New York, have invented certain new and useful Improvements in Pneumatic Tires, of which the following is a specification, reference being had to the drawings accompanying and forming a part of the same.

The invention which is subject of my present application for Letters Patent is an improvement in pneumatic tires, the primary object of which is to provide a pneumatic tire less liable to be punctured than ordinary tires, but having the resiliency or life of those which are not constructed or provided with special means for preventing such accidents.

Many forms of so-called "puncture-proof" or "non-puncturable" pneumatic tires have been constructed or proposed, but in all of such tires, so far as I have any information, the property of non-puncturability or resistance to the passage of pins, thorns, or sharp-pointed bodies encountered in almost every road and path is secured only at the sacrifice of lightness, resiliency, and elasticity. In other words, the covering or sheath of the tire is either made thicker or is composed of or contains some form of armor, but in every case the walls of the tire under the action of internal air-pressure are rendered rigid by the incorporation therewith or the application thereto of the armor, and this to such an extent that the tire drags and is so wanting in life or resiliency as to be unpleasant to ride.

In carrying out my invention I employ a protective cover or what may for convenience be designated as an "armor," or, in other words, a material capable of resisting to a greater or less extent the puncture of the tire by sharp or pointed objects or even to afford a bullet-proof cover, but it is not incorporated with the wall of the tire proper nor intimately united to it, but merely held or supported by attachment to the inner or seating portion of the tire or the wheel in position intermediate to the tread of the tire and the road or other surface over which it travels.

My invention therefore consists, broadly, in this, viz: a protective cover or sheath applied to a tire, not as a part of the tire proper, but as a fixed attachment therefor, so as to afford a surface upon which the tire may roll. From the nature of the invention it is evident that the cover or sheath may be applied and secured in many different ways, either to the tire or rim, with the same result.

In the preferred form of my invention I use as the tire proper a light, thin, and highly-resilient hose-pipe or single-tube tire surrounded by a cover or sheath of canvas provided with a thick rubber tread or otherwise constructed to resist puncture. The edges of the said cover are united, preferably, to the tire, as by means of cement, but only at such portions, or nearly so, as are within or below the edges of the rim, the unattached portion being of so much greater dimensions than the tire as to loosely surround the latter even when it is inflated to its fullest capacity. Under these conditions the weight of the wheel and rider is sustained by the tire proper, which may be made with any desired degree of resilience, while the cover, which loosely surrounds the tire and which is entirely free to alter its shape, is simply interposed between the tire and the ground.

The improvement is illustrated in the accompanying drawings.

Figure 2:
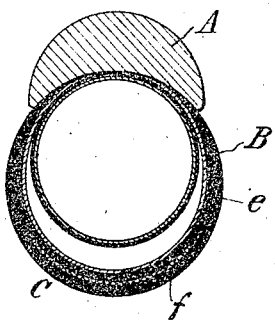

Figure 1 is a sectional view of my improved tire, showing portions of a wheel on which it is mounted. Fig. 2 is a section of a tire and rim, showing a modification.

A designates a rim of any form or kind adapted to receive a pneumatic tire.

B is an inflatable or pneumatic tire, which, as shown, is composed of a rubber-lined tube of fabric covered or coated exteriorly with rubber, but which may be any kind of pneumatic tire and is preferably made light and strong like the higher grades of track or racing tires.

C is a loose uninflatable protective sheath or cover, which in the present instance is shown as composed of a canvas band $d$, with an outer and comparatively thick band of india-rubber $e$ united to it, or, as in Fig. 2, a rubber band $e$ in which is embedded a strip or plate $f$ of steel or other suitable puncture-proof material. The edges of the cover C are united to the inner portion of the tire B or the exterior of the rim, or to both, as by means of cement, but the remaining portion is left detached from the tire and should be substantially larger than the tire when inflated, so that it will be entirely free to bend or change its shape at the point of contact with the ground, as shown at the lower portion of Fig. 1.

I have found that when the above-described relations between the tire and cover are preserved a comparatively thick and highly puncture-proof armor may be applied to a tire which detracts but slightly from its resiliency and, in fact, in some respects improves its riding qualities.

I am aware that covers or sheaths of many kinds have been employed in tires, but in all cases of which I am aware the said cover has either been united to the inflatable portion of the tire or secured thereto or to the rim in such manner as to constitute a part of the wall of the tire proper when under inflation; but in my present improvement the cover and the tire are or may be practically independent in every sense except in the one that the cover, while maintained in fixed relation to the wheel, is interposed between the tire and the ground.

What I claim is—

1. The combination with a pneumatic tire of a protective cover, secured in fixed relation to the tire but normally free from attachment to or intimate contact with the tread portion of the same, and affording a surface upon which the tire bears at the point of contact with the ground, as set forth.

2. The combination with a pneumatic tire of a protective cover or sheath secured in fixed relation to the tire, but of substantially larger dimensions than the tire when fully inflated.

3. The combination with a pneumatic tire of a protective cover or sheath of substantially larger internal circumference than the tire when fully inflated and secured to the tire at its inner or seating portion only, as set forth.

4. The combination with a pneumatic tire of a protective cover applied to and secured in fixed relation therewith, but normally free from attachment to or intimate contact with the outer or tread portions of the tire, and of such dimensions relatively to the tire, when the latter is inflated, as to permit the said cover to alter its shape independently of the tire, as set forth.

ALEXANDER STRAUS.

Witnesses:
M. LAWSON DYER,
EDWIN B. HOPKINSON.